Sept. 4, 1956   S. H. NORTON   2,761,434
VALVE ROTATING DEVICE
Filed Oct. 20, 1953   4 Sheets-Sheet 1
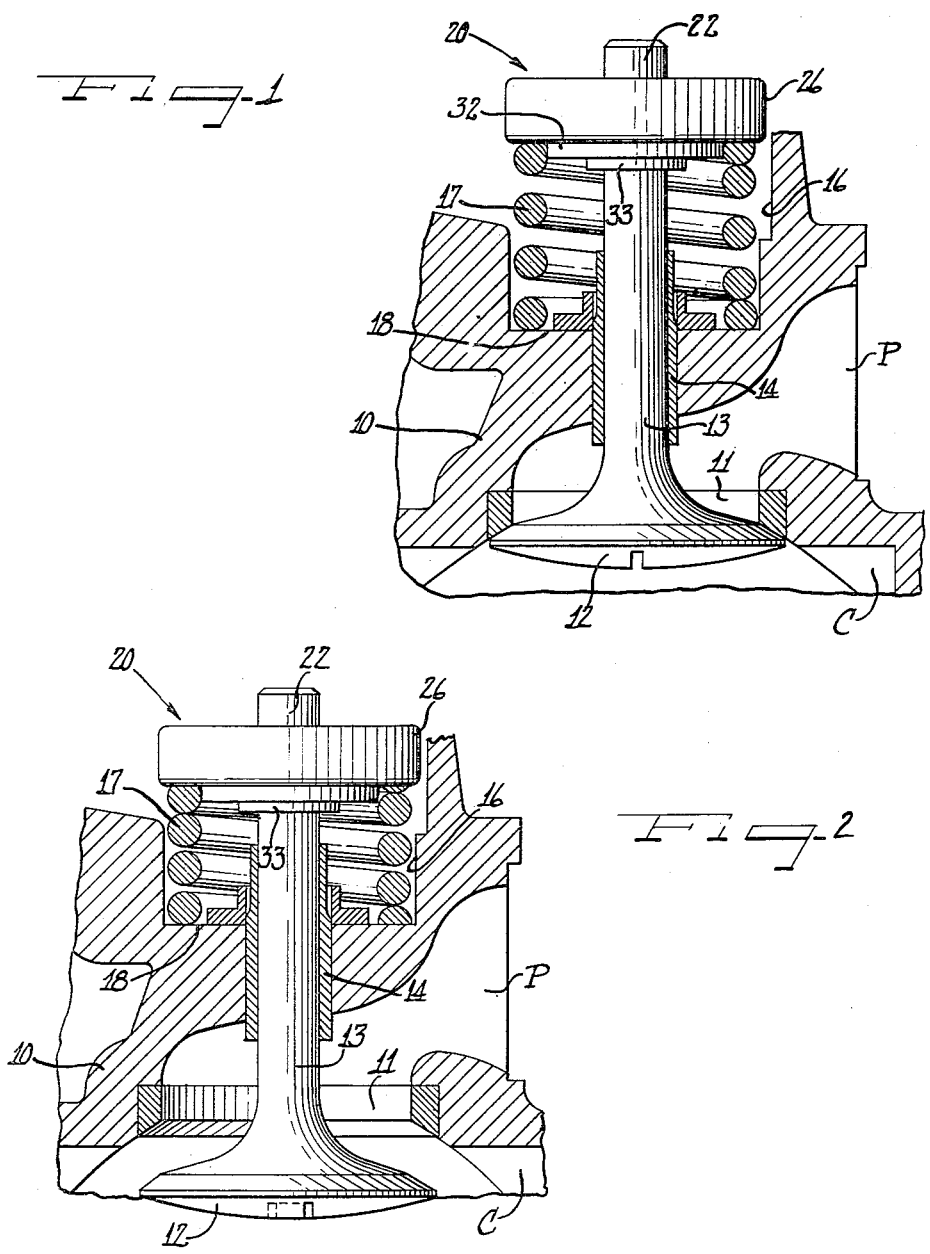
Inventor
Samuel Harry Norton Sept. 4, 1956
S. H. NORTON
2,761,434
VALVE ROTATING DEVICE
Filed Oct. 20, 1953
4 Sheets-Sheet 2
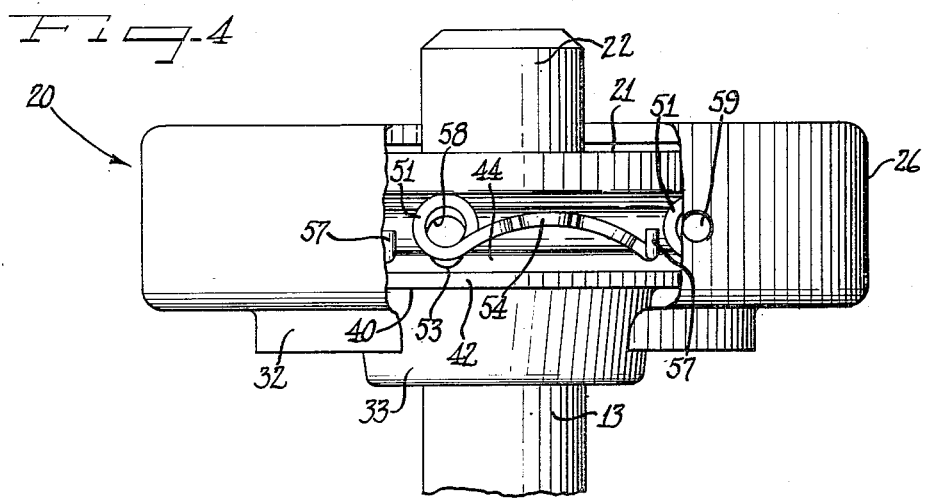
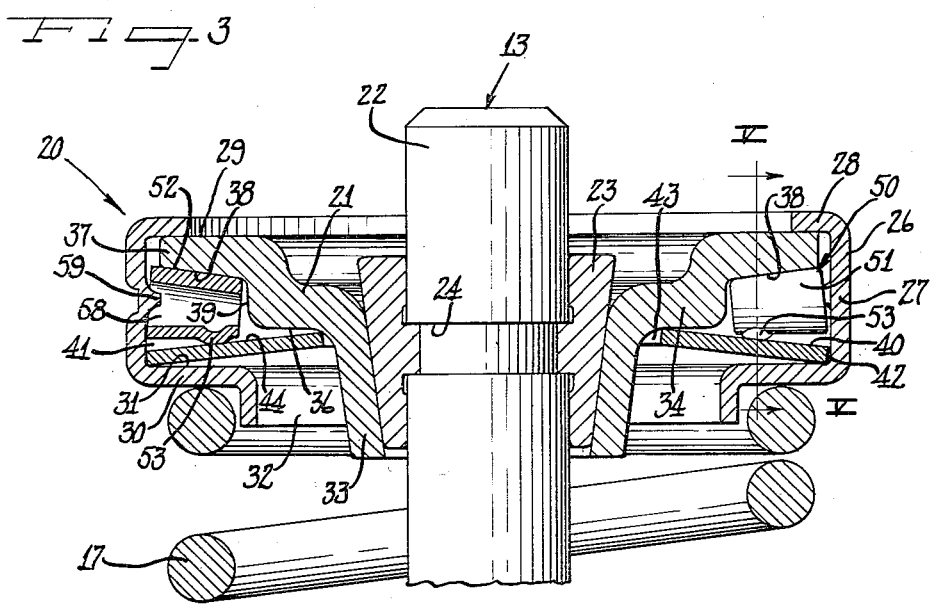
Inventor
Samuel Harry Norton

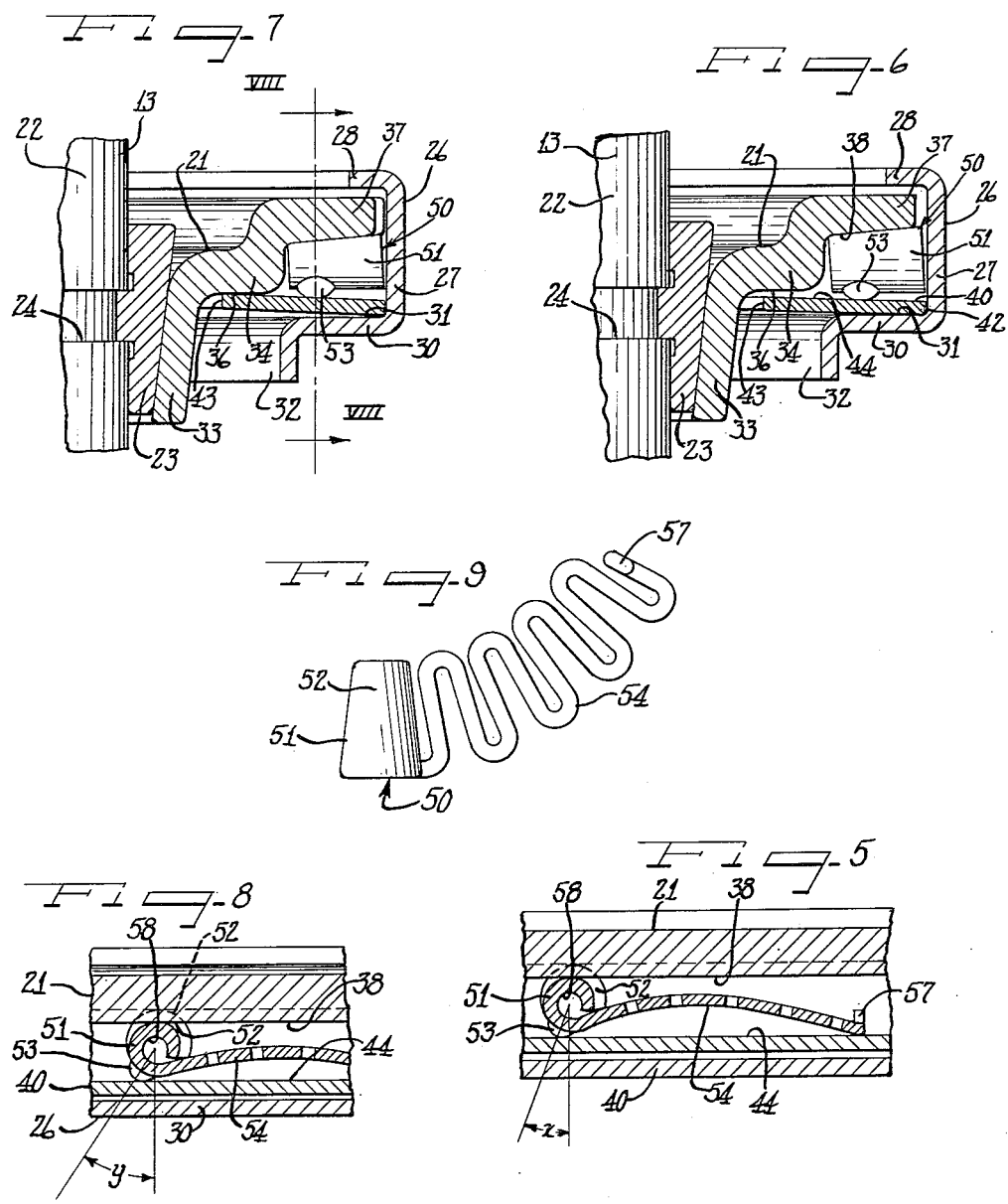

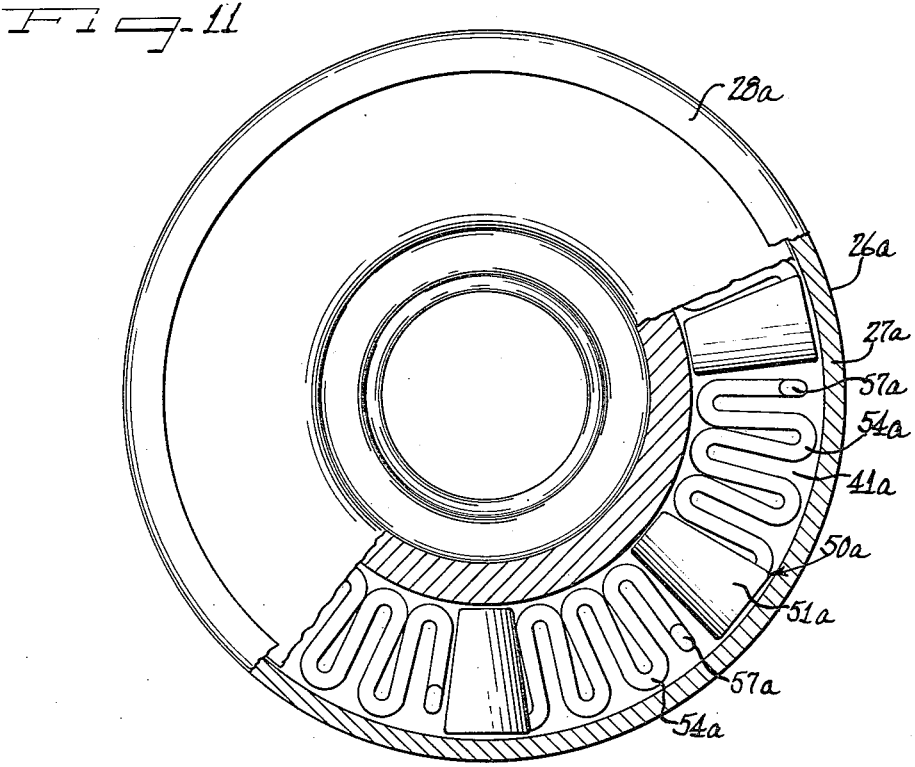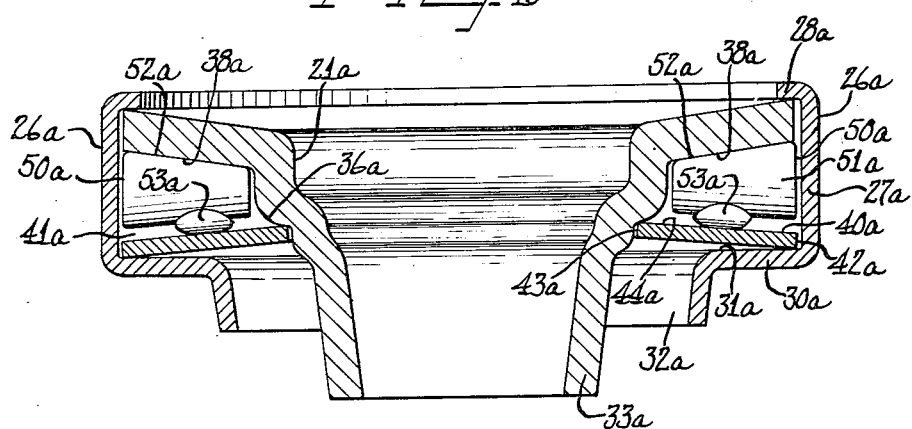

United States Patent Office 2,761,434
Patented Sept. 4, 1956

2,761,434

VALVE ROTATING DEVICE

Samuel H. Norton, University Heights, Ohio, assignor to Thompson Products, Inc., Cleveland, Ohio, a corporation of Ohio Application October 20, 1953, Serial No. 387,094

20 Claims. (Cl. 123—90)

This invention relates generally to valve rotators and more particularly relates to a self contained valve rotating device for automatically rotating a poppet valve as a function of the cyclic operation thereof.

Heretofore, valve rotating devices have been provided in connection with poppet valves of internal combustion engines since it has been found that rotation of the valves during engine operation causes the valves to continually seat in different angular relationship with respect to the cylinder head, thereby to even out any tendency towards carbon deposits and wear associated with particularly severe conditions at any portion of the valve or seat. Rotation of a valve during engine operation is also desirable since the valve does not acquire a recurrent bending force in the same direction when a deposit occurs at a particular point on the valve seat. Accordingly, with the use of valve rotating devices, the valves operate in an efficient manner for a longer period of time and with greater efficiency than is otherwise possible.

In accordance with the principles of the present invention, inner and outer relatively rotatable valve parts are provided and together form an annular recess receiving an annular spring washer having inner and outer edges engaging the inner and outer valve parts, respectively. There is provided a plurality of shiftable elements in the recess in circumferentially spaced relation between the washer and an adjoining one of the valve parts to rotatably drive the parts whenever the washer is deflected, for example, under increased axial loading. Each of the shiftable elements comprises a ball cone particularly characterized by the provision of a conical surface on one portion of the periphery and ball shaped protrusion on another portion of the periphery. The ball cone is preferably shaped to take an involute form and is arranged in the recess so that the ball shaped protrusion engages the spring washer and the conical surface engages an adjoining valve part. A circumferentially extending spring is preferably attached to the ball cone.

By virtue of such provision, the spring washer will transfer normal spring loads between the inner and outer valve parts, however, if an increased load is applied as occurs during a valve opening operation, the washer is pivoted on the ball shaped protrusion so that the inner peripheral edge will be moved away from the inner valve part and so that rotational pressure will be exerted against the ball cone. As a result the ball cone will be rotated so that the surface portions thereof will generate an involute curve. At the same time, the adjoining valve part will be incrementally rotated until the inner peripheral edge of the spring washer again engages the other relatively rotatable valve part, which engagement will occur when the ball cone is rotated towards a smaller diameter portion thereof. This action causes the valve to rotate relative to the valve seat whenever the valve is off the seat.

As the valve is lowered to seat the valve, the spring connected to each ball cone will be extended and the pressure against the outer edge of the spring washer will be decreased, thereby permitting the spring washer to assume its initial position. Consequently, the ball cone will be rotated in a return direction.

A particular feature of the present invention resides in the utilization of a spring which is made integral with the ball cone and which is made S-shaped in order to give the spring greater active length and correspondingly longer life and more resilience.

Tongue and recess means are also provided between each respective ball cone and one of the relatively rotatable parts so as to circumferentially position the ball cones in the valve rotating device.

The end of the spring is also provided with a stop lug so as to prevent interfering engagement with the next adjacent ball cone.

It is an object of the present invention, therefore, to provide a positive means of rotating engine valves when the valve is raised off of its seat by means of a valve rotating device which comprises a reduced number of simplified elements convenient and economical to manufacture.

It is another object of the present invention to provide a valve rotating device of minimum weight.

A further object of the present invention is to provide a valve rotating device which is applicable at any desired portion of the valve assembly including the top portion of the valve or at the base of the valve.

Many other features, advantages and additional objects of the present invention will become manifest to those versed in the art upon making reference to the detailed description which follows and the accompanying sheets of drawings in which a preferred structural embodiments of a valve rotating device incorporating the principles of the present invention is shown by way of illustrative example.

On the drawings:

Figure 1 is a vertical cross-sectional view with parts in elevation of a poppet valve assembly equipped with a valve rotating device according to the present invention;

Figure 2 is a view similar to Figure 1 but illustrating the position of the parts when the valve is opened;

Figure 3 is a cross-sectional view of parts shown in elevation of the valve rotating device illustrated in Figures 1 and 2;

Figure 4 is an enlarged fragmentary elevational view showing a valve rotating device according to the principles of the present invention with parts broken away to illustrate additional details of construction;

Figure 5 is a fragmentary cross-sectional view taken substantially on the line V—V of Figure 3;

Figure 6 is a fragmentary cross-sectional view similar to Figure 3 but illustrating the position of the parts of the valve rotating device when subject to increased axial load and showing the spring washer compressed and off of its inner seat just previous to a relative rotational movement between the valve parts;

Figure 7 is a fragmentary cross-sectional view similar to Figure 6 but showing the parts of the valve rotating device when subject to increased axial load but after a rotational movement has occurred;

Figure 8 is a fragmentary cross-sectional view taken substantially on the line VIII—VIII of Figure 7;

Figure 9 is a plan view of an involute ball cone spring provided in accordance with the principles of the present invention;

Figure 10 is a cross-section view generally similar to the view of Figure 3 but showing a modified valve spring cap constructed to afford the use of larger dimensioned parts in accordance with the principles of the present invention; and Figure 11 is a plan view of the device shown in Figure 10 with parts broken away to illustrate the circumferential spacing arrangement of the shiftable elements provided in accordance with the principles of the present invention.

As shown on the drawings:

In Figures 1 and 2, the reference numeral 10 indicates an engine part such as a portion of a cylinder head having a combustion chamber C and a port P, for example, an exhaust port. A seat ring 11 is secured in the mouth of the port P and has a bevelled seating face facing the combustion chamber C for engaging the correspondingly bevelled seating face on a valve head 12 carried on one end of a valve stem 13 and provided to control the port P.

The stem 13 is slidably mounted in a stem guide 14 carried by the engine part 10 and extends into a recess 16 formed in the engine part 10.

A coil type valve spring 17 has one end bottomed on a wall 18 at the bottom of the recess 16 and the opposite end of the valve spring 17 engages the valve rotating device of the present invention which is indicated generally by the reference numeral 20 and which is operatively connected to the valve stem 13 in order to rotate the valve in accordance with the cyclic operation thereof.

In the preferred embodiment herein illustrated by way of illustrative example, the valve rotating device 20 is located between the upper end of the valve spring 17 and the tip of the valve stem 13, thereby to facilitate the advantageous exploitation of the conventional valve spring cap which is usually provided near the tip end of a valve stem, however, it will be understood that the features of the present invention are applicable to any valve rotating device effectively interposed between a relatively stationary engine part and a relatively rotatable valve, either when installed at the tip end of the valve as shown in Figures 1 and 2 or at the base of the valve spring 17 in the recess 16.

Referring now to Figure 3, the structural details of the valve rotating device 20 will be described. Generally, the device 20 comprises inner and outer relatively rotatable valve parts, however, these parts may conveniently comprise a conventional valve spring cap indicated at 21 connected to the tappet end 22 of the valve stem 13 by means of a conventional valve spring cap tapered lock 23 engaging an annular groove 24 to anchor the valve spring cap 21 in firm assembly with the valve stem 13. In other words, the valve spring cap 21 can be considered as the inner relatively rotatable part of the valve rotating device 20 according to the principles of the present invention.

The outer part of the valve rotating device 20 comprises a housing member 26 of a generally ring-shaped annular configuration. The housing 26 includes an axially extending flat wall 27 having a radially inwardly extending flange 28 at the upper end thereof which engages a radially extending flat surface 29 provided by the valve spring cap 21.

At the bottom of the wall 27 is provided a radially inwardly extending wall 30 which is generally parallel to the flange 28 and which provides a flat wall surface 31. At the radial inner portions of the wall 30 is provided an axially extending flange 32 which conveniently comprises a pilot portion for entering the convolutions of the coil type valve spring 17. As shown in Figure 3, the end of the valve spring 17 engages and bottoms against the seat provided by the flange 32 and the wall 30 of the housing 26.

In regard the structural details of the valve spring cap 21, a generally axially extending portion 33 is provided and is tapered to conform to the taper of the lock 23. The valve spring cap 21 is flared radially outwardly as at 34 thereby to provide a radially extending wall indicated at 36. The outermost portion of the valve spring cap 21 is formed as a flange 37 and the under side of the flange 37 provides a tapered surface indicated at 38. A generally axially extending wall 39 is provided between the tapered surface and the radially extending wall 36.

To transmit axial spring loading from the housing 26 to the valve spring cap 21 there is provided an annular resilient spring washer 40 which is slightly bowed so as to have axially offset inner and outer peripheral edges when in a normal unstressed position.

In accordance with the principles of the present invention, the housing 26 cooperates with the valve spring cap 21 to provide an annular recess 41 for receiving the spring washer 40. Thus, the spring washer 40 is provided with an outer peripheral edge 42 which seats and engages upon the surface 31 of the wall 30 on the housing member 26. The spring washer 40 is further provided with an inner peripheral edge indicated at 43 seating and engaging against the radial wall 36 provided on the valve spring cap 21. A suitable form of spring washer 40 is commercially available under the identification "Bellville" spring washer.

Because of the axial offset of the inner edge 43 and the outer edge 42 of the spring washer 40, a tapered surface 44 is provided and forms the floor of the recess 41, the surface 44 and the surface 38 lying on convergent intersecting conical surfaces.

In accordance with the principles of the present invention, a plurality of circumferentially spaced shiftable elements are provided in the recess 41 between the spring washer 40 and the valve spring cap 21. Each shiftable element more particularly comprises what shall be referred to herein as the ball cone or ball cone member 50.

The ball cone members are provided with conical peripheral surfaces 51 so that a conical surface 52 on the upper part of the periphery will engage the tapered surface 38 on the valve spring cap 21. Each ball cone member 50 is particularly characterized by the provision of a ball shaped protrusion forming a ball 53 and engaging the spring washer 40 intermediate its outer and inner edges 42 and 43 respectively.

As shown on Figures 5 and 8, a vertical line extending through the center of the ball 53 is offset relative to a line extending through the center of the cone. Thus, the connecting surfaces constitute an interrupted involute.

Moreover, if the ball cone member 50 is rotated between two surfaces such as are provided by the spring washer 40 and the valve spring cap 21, the surfaces will approach each other because the surfaces of the ball 53 and the cone surfaces 52 generate an involute which decreases in diameter as the ball cone member 50 is turned.

This phenomenon is clearly illustrated in Figures 5 and 8. In Figure 5, the displacement angle between the center lines through the ball 53 and the ball cone member 50 is represented by the reference character X and the greater angle in Figure 8 is represented by the reference character Y. The distance between the substantially parallel parts, namely, the spring washer 40 and the valve spring cap 21, has decreased as at Figure 8, compared to that shown in Figure 5. If a force is placed against the surface-providing parts (40 and 21), tending to press them together, the ball cone member 50, due to its involute form, will tend to rotate, making the angle Y greater than the angle X. This rotation will cause the spring washer 40 and the valve spring cap 21 to move longitudinally and toward each other.

Each ball cone member 50 is further provided with a circumferentially extending spring indicated at 54. As shown in Figures 4 and 5, the springs 54 are bowed in a generally arcuate configuration. Accordingly, if the ball cone members 50 are forced to rotate, each of the springs 54 attached to the respective ball cone members 50, will tend to straighten out under tension. When the pressure on the spring washer 40 and the valve spring cap 21 is relieved, each spring 54 will rotate its respective ball cone member 50 back to its normal position. The rolling action of the ball cone members 50 under pressure cause the valve spring cap 21 to rotate whereupon the valve stem 13 will also be rotated to angularly readjust the valve head 12 relative to the valve seat ring 11.

It will be understood that the ball cone members 50 are provided with conical surfaces 51 in order to permit the development of a pure rolling action between the ball cone members 50 and the valve spring cap 21. Thus, the conical surfaces 51 are preferably prescribed as the peripheral surface of a cone having its axis intersecting the axis of the valve stem 13. Moreover, the valve spring cap 21 is preferably provided with a tapered surface 38 bevelled to the same angle as that employed on the ball cone members 50.

It is also desirable to have the ball 53 on the ball cone member 50 bear at all times against the spring washer 40 at approximately the middle portion of the spring washer 40 between the inner and outer edges 43 and 42. Accordingly, the ball 53 is preferably projected from the under side of the conical surfaces 51 and may be suitably offset with respect to the conical surfaces 51 as to engage an optimum medial portion of the surface 44 provided by the spring washer 40.

The spring 54 is preferably connected directly to the ball cone member 50 and may be made integral therewith or attached by suitable fastening means. The spring 54 conveniently comprises a wire form member bent to provide S-shaped convolutions, thereby increasing the active length of the spring 54 and tending to provide a correspondingly longer life for the spring 54.

In the preferred structural embodiment of the invention herein described, the spring 54 is made integral with the ball cone member 50 and is preferably joined thereto by a portion which is thicker next to the ball cone member 50 than at its end, thereby to provide improved stress characteristics to eliminate breakage next to the ball cone member 50. By making the spring 54 integral with the ball cone member 50, convenience in assembling the unit is also facilitated, particularly, if a coiled spring is employed or the spring and ball cone members are made separately and interconnected.

As is clearly illustrated in Figures 4, 5 and 9, the free end of the spring 54 terminates in a prong or stop lug 57 which prevents the end of the spring from sliding under the ball cone of the next adjacent shiftable element.

Referring to Figures 5, 8 and 3, it will be noted that each of the shiftable elements may be conveniently fabricated from a sheet form member bent back upon itself to provide the hollow cone with the arcuately extending spring connected thereto. By so providing a hollow cone with a central recess 58, the housing 26 may be provided with a plurality of circumferentially spaced locator lugs 59 extending radially inwardly and received in the respective recesses 58 to circumferentially position the ball cone members 50. Each lug 59 may be conveniently formed by offsetting a portion of the wall of the housing 26. The ball 53 on the conical surface of the ball cone member 50 is formed as a dimple or offset.

The form of the invention illustrated in the embodiment of Figures 10 and 11 is in all functional respects similar to that described in connection with Figures 1-9. It will be noted, however, that a valve spring cap 21a is provided which is somewhat modified in that a shortened radial wall surface 36a is provided and a longer inclined tapered surface 38a is provided to correspondingly increase the size of an annular recess 41a formed between the valve spring cap 21a and a housing member 26a.

By virtue of such provision, the ball or dimple or ball protrusion 53a formed on the conical surface of the ball cone member 50a may be placed or located more towards the center of the cone. Moreover, the entire shiftable element can be constructed to provide a wide unit thereby facilitating the provision of a longer spring 54a.

Because of the functional similarities between the embodiment of Figures 10 and 11 and the embodiment of Figures 1-9, similar reference numerals with a suitable suffix have been shown on the drawings on all corresponding structural elements. It will be understood, furthermore, that the view of Figure 11 may be referred to in connection with the embodiment of Figures 1-9 to illustrate the general assembly of the valve rotator components.

In operation, pressure is applied against the tappet end of the valve stem 13 whereupon the valve and valve rotating device 20 are forced down, separating the valve head 12 from the valve seat insert 11 and compressing the valve spring 17. As the spring 17 compresses, a load is exerted against the housing 26 in proportion to the distance the spring is compressed.

The increased axial load is transferred from the housing 26 to the outer periphery of the spring washer 40, the inner edge of the spring washer 40 being supported against the valve spring cap 21. In this position, the ball 54 on the ball cone member 50 is in contact with the spring washer 40 at approximately the mid point thereof between the inner and outer annular edges 42 and 43. The spring 54 attached to the ball cone member 50 keeps the element rotated until the widest diameter thereof touches the valve spring cap 21 at the conical surface 52, the ball 53 touching the spring washer 40 on the surface 44. As the pressure on the spring washer 40 increases, the pressure on the outer edge 42 also increases whereupon the spring washer 40 tends to flatten out and will pivot on the ball 53 until the inner edge 43 is forced away from the supporting wall surface 36 of the valve spring cap 21. This operating condition is clearly illustrated in Figure 6.

As the spring washer 40 is forced away from the supporting surface 36, increased pressure is exerted against the involute form of the ball cone member 50 and causes the element to rotate. The rotation of the ball cone member 50, which is tight against the valve spring cap along the conical surface 52, will turn the valve spring cap 21 a small increment since the valve spring cap 21 is relieved from the inner edge 43 of the spring washer 40. Accordingly, the ball cone member 50 and the valve spring cap 21 will rotate until a smaller diameter on the ball cone member 50 permits the spring washer 40 to again seat on the valve spring cap 21. This action causes the valve to rotate relative to the valve seat when the valve is off of the seat. The operating condition is clearly illustrated in Figure 7.

As the valve is lowered to seat the valve head 12 against the valve seat insert 11, the spring 17 is extended and the pressure against the outer edge 42 of the spring washer 40 increases, thereby permitting the spring washer 40 to assume its original position as shown in Figure 3. As the spring washer 40 changes from the flatter position as shown in Figure 7 and Figure 6, to the conical position, the distance between the valve spring cap 21 and the spring washer 40 increases. The ball cone member 50 rotates back, following up the extended gap between the valve spring cap 21 and the spring washer 40, being forced back by the spring 54.

As the valve spring cap 21 is in contact with the spring washer 40 at its inner edge 43 during the valve closing, the valve spring cap 21 will be prevented from being rolled back to its original position, thereby maintaining the small increment of rotation previously imparted thereto.

Although various minor structural modifications might be suggested by those versed in the art, it should be understood that I do not wish to be limited to the preferred structural embodiment herein described by way of illustrative example only but wish to embody within the scope of the patent warranted hereon all such modifications as reasonably properly come within the scope of my contribution of the art.

I claim as my invention:

1. A device for effecting relative rotation between inner and outer relatively rotatable parts in response to increased loads which comprises inner and outer relatively rotatable parts, a resilient member connecting said parts, and shiftable ball cones having a ball shaped protrusion engaging said resilient member and a conical surface engaging one of said parts, said ball cones having a surface portion prescribing an interrupted involute, said ball and cone surfaces generating an involute to relatively rotatably drive the parts whenever the resilient member is deflected and means for maintaining the ball cones in operative position.

2. A device for effecting relative rotation between inner and outer relatively rotatable parts in response to increased loads which comprises, inner and outer relatively rotatable parts, a resilient member connecting said parts, and shiftable ball cones having a ball shaped protrusion engaging said resilient member and a cone surface engaging one of said parts, said ball and cone surfaces generating an involute upon rotation thereof to relatively rotatably drive the parts whenever the resilient member is deflected and means for maintaining said ball cones in operative position.

3. A rotating device comprising inner and outer parts relatively rotatable around a prescribed axis, a deflectable member between said parts for transmitting variable axially directed loads therebetween, and shiftable members between one of said parts and said deflectable member comprising ball cones each having a conical surface and a ball shaped protrusion separated by a surface portion prescribing an interrupted involute, the ball and cone surfaces generating an involute in response to deflection of said deflectable member under increased axial loads, thereby to relatively rotate the parts and means for maintaining said shiftable members in operative position.

4. A valve rotating device comprising outer and inner relatively rotatable parts adapted to be connected to an engine part and a valve member, respectively, an annular recess formed between said parts, an annular resilient washer in said recess connecting said parts, and a plurality of circumferentially spaced ball cones in said recess, one of said parts and said washer providing spaced opposed surfaces, each ball cone having a cone and a ball formed on the peripheral surface thereof engaging the respective opposed surfaces, the surfaces of said ball and said cone generating an involute upon rotation of said ball cones in response to deflection of said resilient washer under increased load to relatively rotate the parts and means for maintaining said ball cones in operative position.

5. A valve rotating device comprising outer and inner relatively rotatable parts adapted to be connected to an engine part and a valve member, respectively, and having an annular recess formed between said parts, an annular resilient washer in said recess connecting said parts, and a plurality of circumferentially spaced ball cones in said recess, one of said parts and said washer providing spaced opposed surfaces, each ball cone having a cone and a ball formed on the peripheral surface thereof engaging the respective surfaces of said opposed surfaces, the surfaces of said ball and cone generating an involute upon rotation of said ball cones in response to deflection of said resilient member under increased load to relatively rotate the parts, and a circumferentially extending spring attached to each ball cone to return the ball cone to normal position under decreased load and maintaining the ball cone in radial alignment.

6. A valve rotating device comprising outer and inner relatively rotatable parts adapted to be connected to an engine part and a valve member, respectively, and having an annular recess formed between said parts, an annular resilient washer in said recess connecting said parts, and a plurality of circumferentially spaced ball cones in said recess, one of said parts and said washer providing spaced opposed surfaces, each ball cone having a cone and a ball formed on the peripheral surface thereof engaging the respective surfaces of said opposed surfaces, the surfaces of said ball and cone generating an involute upon rotation of said ball cones in response to deflection of said resilient member under increased load to relatively rotate the parts, and a circumferentially extending spring attached to each ball cone to return the ball cone to normal position under decreased load and maintaining the ball cone in radial alignment, said spring comprising a wire form member bent to provide a pluarlity of S shaped convolutions.

7. In a valve rotating device, a valve spring cap and a complementary shaped enclosure member adapted to seat a valve spring and forming inner and outer relatively rotatable valve parts, respectively, an annular spring washer having its inner annular peripheral edge engaging said spring cap and its outer annular peripheral edge engaging said enclosure member to transfer normal valve spring loading between the valve parts, a plurality of circumferentially spaced ball cones between said washer and said valve spring cap, each ball cone having a ball formed in the peripheral surface thereof engaging said washer intermediate its inner and outer peripheral edges, each ball cone further having a conical surface portion engaging said valve spring cap, said washer being pivoted on said ball in response to increased load between said parts to move the inner peripheral edge of said spring washer away from said valve spring cap and exerting rotational pressure against said ball cone to incrementally rotate said valve spring cap until said inner peripheral edge of said washer again engages said valve spring cap upon rotation of said ball cone to a smaller diameter portion and means for maintaining said ball cones in operative position.

8. In a valve rotating device, a valve spring cap and a complementary shaped enclosure member adapted to seat a valve spring and forming inner and outer relatively rotatable valve parts, respectively, an annular spring washer having its inner annular peripheral edge engaging said spring cap and its outer annular peripheral edge engaging said enclosure member to transfer normal valve spring loading between the valve parts, a plurality of circumferentially spaced ball cones between said washer and said valve spring cap, each ball cone having a ball formed in the peripheral surface thereof engaging said washer intermediate its inner and outer peripheral edges, each ball cone further having a conical surface portion engaging said valve spring cap, said washer being pivoted on said ball in response to increased load between said parts to move the inner peripheral edge of said spring washer away from said valve spring cap and exerting rotational pressure against said ball cone to incrementally rotate said valve spring cap until said inner peripheral edge of said washer again engages said valve spring cap upon rotation of said ball cone to a smaller diameter portion, and a circumferentially extending spring connected to each ball cone and operating to rotate said ball cone back to its original position whenever the load between said parts is decreased.

9. In a valve rotating device, a valve spring cap and a complementary shaped enclosure member adapted to seat a valve spring and forming inner and outer relatively rotatable valve parts, respectively, an annular spring washer having its inner annular peripheral edge engaging said spring cap and its outer annular peripheral edge engaging said enclosure member to transfer normal valve spring loading between the valve parts, a plurality of circumferentially spaced ball cones between said washer and said valve spring cap, each ball cone having a ball formed in the peripheral surface thereof engaging said washer intermediate its inner and outer peripheral edges, each ball cone further having a conical surface portion engaging said valve spring cap, said washer being pivoted on said ball in response to increased load between said parts to move the inner peripheral edge of said spring washer away from said valve spring cap and exerting rotational pressure against said ball cone to incrementally rotate said valve spring cap until said inner peripheral edge of said washer again engages said valve spring cap upon rotation of said ball cone to a smaller diameter portion, and a circumferentially extending spring connected to each ball cone and operating to rotate said ball cone back to its original position whenever the load between said parts is decreased, said spring having a stop lug formed on the free end thereof to prevent the end of the spring from sliding under the next adjacent ball cone.

10. In a valve rotating device, a valve spring cap and a complementary shaped enclosure member adapted to seat a valve spring and forming inner and outer relatively rotatable valve parts, respectively, an annular spring washer having its inner annular peripheral edge engaging said spring cap and its outer annular peripheral edge engaging said enclosure member to transfer normal valve spring loading between the valve parts, a plurality of circumferentially spaced ball cones between said washer and said valve spring cap, each ball cone having a ball formed in the peripheral surface thereof engaging said washer intermediate its inner and outer peripheral edges, each ball cone further having a conical surface portion engaging said valve spring cap, said washer being pivoted on said ball in response to increased load between said parts to move the inner peripheral edge of said spring washer away from said valve spring cap and exerting rotational pressure against said ball cone to incrementally rotate said valve spring cap until said inner peripheral edge of said washer again engages said valve spring cap upon rotation of said ball cone to a smaller diameter portion, and tongue and recess means between each respective ball cone and said enclosure member to circumferentially position said ball cones between the parts.

11. In a valve rotating device, inner and outer relatively rotatable valve parts together forming an annular recess, an annular spring washer in said recess having inner and outer edges engaging said inner and outer parts respectively, and a plurality of shiftable elements in said recess between said washer and an adjoining one of said parts and arranged to rotatably drive said parts whenever said washer is deflected over said shiftable elements, and tongue and recess means between said shiftable elements and one of said parts to circumferentially position said shiftable elements.

12. In a valve rotating device, inner and outer relatively rotatable valve parts together forming an annular recess, an annular spring washer in said recess having inner and outer edges engaging said inner and outer parts respectively, and a plurality of shiftable elements in said recess between said washer and an adjoining one of said parts and arranged to rotatably drive said parts whenever said washer is deflected over said shiftable elements, each shiftable element comprising a ball cone having a ball portion engaging said washer and a cone portion engaging said adjoining part, said washer pivoting over said ball portion and said ball cone rotating on a surface formed as an interrupted involute to rotatably drive said parts and means maintaining said shiftable elements in operative position.

13. In a valve rotating device, inner and outer relatively rotatable valve parts together forming an annular recess, an annular spring washer in said recess having inner and outer edges engaging said inner and outer parts respectively, and a plurality of shiftable elements in said recess between said washer and an adjoining one of said parts and arranged to rotatably drive said parts whenever said washer is deflected over said shiftable elements, each shiftable element comprising a ball cone having a ball portion engaging said washer and a cone portion engaging said adjoining part, said washer pivoting over said ball portion and said ball cone rotating on a surface formed as an interrupted involute to rotatably drive said parts, and a circumferentially extending spring connected to each ball cone to return bias said ball cone to a normal position.

14. In a valve rotating device, inner and outer relatively rotatable valve parts together forming an annular recess, an annular spring washer in said recess having inner and outer edges engaging said inner and outer parts respectively, and a plurality of shiftable elements in recess between said washer and an adjoining one of said parts and arranged to rotatably drive said parts whenever said washer is deflected over said shiftable elements, each shiftable element comprising a ball cone having a ball portion engaging said washer and a cone portion engaging said adjoining part, said washer pivoting over said ball portion and said ball cone rotating on a surface formed as an interrupted involute to rotatably drive said parts, and a circumferentially extending spring connected to each ball cone to return bias said ball cone to a normal position, said spring comprising a wire form member bent to provide a plurality of S-shaped convolutions to increase the effective length thereof.

15. In a valve rotating device, inner and outer relatively rotatable valve parts together forming an annular recess, an annular spring washer in said recess having inner and outer edges engaging said inner and outer parts respectively, and a plurality of shiftable elements in said recess between said washer and an adjoining one of said parts and arranged to rotatably drive said parts whenever said washer is deflected over said shiftable elements, each shiftable element comprising a ball cone having a ball portion engaging said washer and a cone portion engaging said adjoining part, said washer pivoting over said ball portion and said ball cone rotating on a surface formed as an interrupted involute to rotatably drive said parts, and a circumferentially extending spring connected to each ball cone to return bias said ball cone to a normal position, said spring comprising a wire form member bent to provide a plurality of S-shaped convolutions to increase the effective length thereof, said spring terminating in a stop lug portion to prevent the end thereof from sliding under the next adjacent ball cone member.

16. A valve rotating device comprising axially adjacent parts including a valve spring cap, a spring washer, and retaining means, said washer and said cap together providing therebetween a pair of radially outwardly diverging surfaces forming tapered upper and lower walls of an annular recess, and a plurality of shiftable elements in said recess, each element comprising a cone conforming in shape to the taper of the annular recess, said cone having a dimple projecting outwardly of its peripheral surface and engaging said washer, a center line through said cone being offset relative to a center line through said dimple, whereupon an increase in axial force between said parts will tend to rotate said shiftable element and to produce a relative rotation between said parts and means maintaining said shiftable element in operative position.

17. A valve rotating device comprising axially adjacent parts including a valve spring cap, a spring washer, and retaining means, said washer and said cap together providing therebetween a pair of radially outwardly diverging surfaces forming tapered upper and lower walls of an annular recess, and a plurality of shiftable elements in said recess, each element comprising a sheet form member having one end looped back upon itself to form a hollow cone conforming in shape to the taper of the annular recess, and having a reduced section portion extending away from said cone and shaped to provide a plurality of S-shaped convolutions to form a spring, said spring being curved generally arcuately to conform to the circumferential curvature of said annular recess and being bowed to provide a generally axial arch, said cone having a dimple projecting outwardly of its peripheral surface and engaging said washer, a center line through said cone being offset relative to a center line through said dimple, whereupon an increase in axial force between said parts will tend to rotate said shiftable element, thereby to produce a relative rotation between said parts, said spring straightening out under tension and operating to rotate said ball cone back to normal position upon a decrease in axial force between said parts.

18. A shiftable element for a valve rotating device of the type described comprising a sheet form member having one end looped back upon itself to form a hollow cone and having a reduced section portion extending away from said cone and shaped to provide a plurality of S shaped convolutions to form a spring, said spring being curved generally arcuately and being bowed in transverse direction to provide an arch, whereby rotation of the element between two substantially parallel surfaces will permit the surfaces to approach one another by virtue of the involute generated by the ball and cone surfaces, said spring adapted to be extended under tension and bowing to its original arch configuration for returning the cone to original position.

19. In a valve rotating device, inner and outer valve parts providing axially adjacent relatively rotatable flat surfaces, continuous biasing means spacing said surfaces apart from one another and shiftable elements between said surfaces, each of said elements comprising a ball cone providing surfaces engaging said flat surfaces and rotating to generate an involute when said flat surfaces approach one another against the biasing force.

20. In a valve rotating device, inner and outer valve parts providing axially adjacent relatively rotatable flat surfaces, continuous biasing means spacing said surfaces apart from one another and shiftable elements between said surfaces, each of said elements comprising a ball cone providing action surfaces engaging said flat surfaces to generate an involute upon rotation thereof when said flat surfaces approach one another against the biasing force, and a spring connected to each shiftable element operable to rotate said elements back to normal position when said flat surfaces are separated.

References Cited in the file of this patent

UNITED STATES PATENTS

| | | |
|---|---|---|
| 2,397,502 | Ralston | Apr. 2, 1946 |
| 2,516,795 | Norton | July 25, 1950 |
| 2,662,511 | Sward | Dec. 15, 1953 |